Jan. 2, 1951     C. F. HOLMBOE     2,536,603
HYDROGENATION REACTOR
Filed April 11, 1946
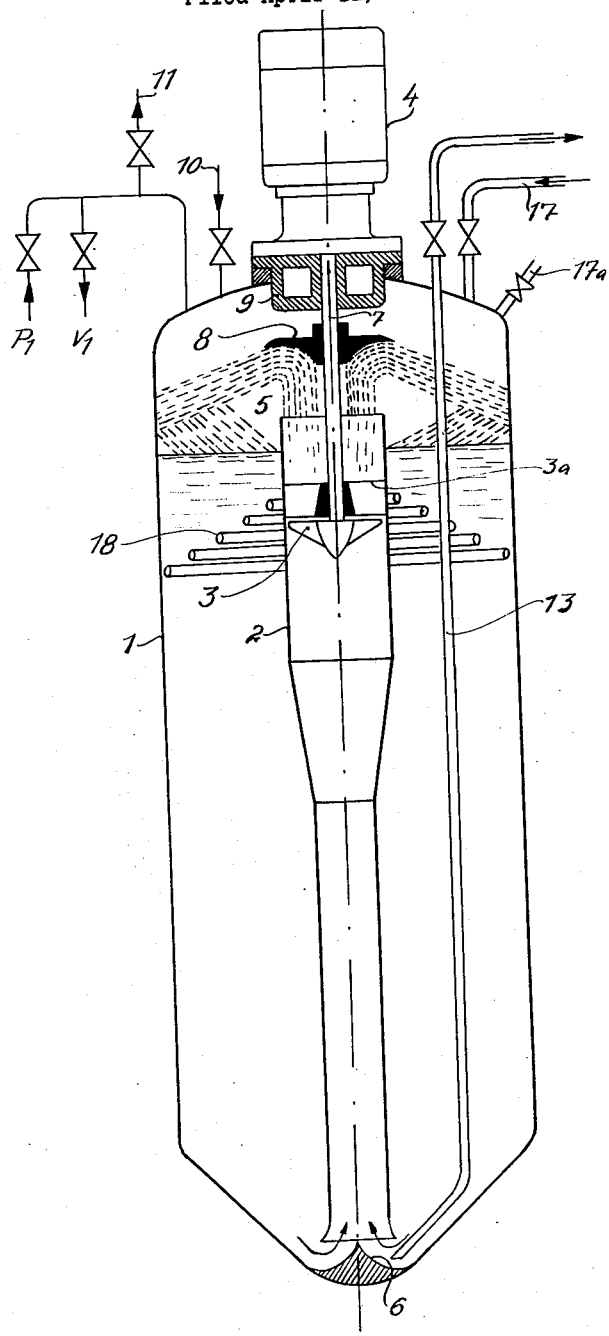
Inventor:
Carl Fredrik Holmboe Patented Jan. 2, 1951

2,536,603

UNITED STATES PATENT OFFICE 2,536,603

HYDROGENATION REACTOR

Carl Fredrik Holmboe, Vestre Aker, near Oslo, Norway, assignor to De Nordiske Fabriker, De-No-Fa, Aktieselskap, Oslo, Norway Application April 11, 1946, Serial No. 661,192
In Norway April 30, 1945

4 Claims. (Cl. 23—285)

The reaction speed in hardening of unsaturated materials including fatty acids and glycerides of fatty acids is [at constant temperature, pressure, catalizer quantity and catalizer activity] dependent upon the velocity with which the materials taking part in the reaction [the fat, the catalizer and the hydrogen] are mixed. It is also dependent upon the manner in which the mixing is carried out.

Analyses carried out have shown that under otherwise equal conditions one may, through a high intensification of the mixing of the three reacting materials per time unit, increase the reaction speed by 150%.

The present invention is based on the acknowledgment that through a high intensification of the mixing speed at the same temperature, pressure and catalizer activity one may reduce reduce the catalizer quantity and thereby obtain a not insignificant saving.

The invention relates to an apparatus of the kind in which a mixture of fat and catalizer is caused to ascend through a circulation pipe provided in a container, which pipe is open at its lower end and has its upper end projecting above the surface of the liquid fat. A number of apparatus of this kind are known. In some of the known apparatus the fat is caused to ascend through the circulation pipe by means of a pump which forces hydrogen in at the lower end of the pipe, either by injector action or according to the mammoth pump principle, such hydrogen carrying the fat upwardly through the pipe. In other known apparatus a propeller is provided in the pipe which drives the fat upwardly.

The present invention relates to an apparatus of the last mentioned type. The primary object of the invention is to produce a high intensification of the fat-catalizer mixing in the hydrogen atmosphere and at the same time obtain a higher efficiency of the circulation system than can be obtained by the known apparatus. Another advantage of the apparatus according to the invention is that of simple construction and very safe operation.

Compared with certain of the previously known apparatus the invention is distinguished by the following features:

The pump is placed in the circulation pipe near the upper end of the latter whereas in the known apparatus it is placed near the lower end of the pipe. By the arrangement according to the invention there is obtained the constructional advantage that the driving shaft of the pump may consist of a relatively short shaft which is introduced into the container from above.

According to the invention the pump consists of an axial turbine pump, comprising a rotor and guide vanes. The effect of the guide vanes is such that the fat is hurled up, from the upper end of the circulation pipe, in the form of an axially directed jet to impinge upon an atomizing disc secured to the driving shaft of the pump and rotating with such shaft, whereby the fat is divided into exceedingly fine droplets and injected into the hydrogen atmosphere. In the known apparatus the pump is not provided with guiding vanes for axially jetting the fat and therefore has a considerably lower efficiency than the pump according to the invention. Furthermore, the known apparatus are not provided with a rapidly rotating atomizing disc, the fine dividing of the fat being obtained in another but not as effective manner.

Especially when using an atomizing disc as indicated above it is of importance that the pump be provided with guiding vanes. These vanes cause the ascending speed of the fat-catalizer mixture to be equalized as much as possible over the entire cross section of the pipe in the portion of the circulation pipe located above the pump. The mixture will therefore be hurled equally against the entire surface of the atomizing disc, which is important when near perfect fine division of the mixture in the hydrogen atmosphere is desired. According to another important feature of the invention the lower portion of the container has the shape of a cone at its bottom, such cone having an upwardly directed tip of a streamline configuration pointing upwardly in the axial direction of the container.

A further feature of the invention consists in that in the container, below the surface of the fat-catalizer mixture, there is provided a cooling spiral which extends evenly over the free cross section between the circulation pipe and the container wall. It is known to provide such apparatus with a cooling coil but such known coils have been helically arranged along the inside of the container wall. By letting the cooling coil have the shape of a plan or preferably conical spiral, the turns of which are evenly distributed over the free flow cross section in the container, a more even and effective cooling is obtained.

The invention comprises finally a method for the use of an apparatus according to the invention which consists in that the filling and emptying of the container take place by means of vacuum and an inactive gas under pressure, respectively.

The invention will now be described in detail with particular reference to the drawing which diagrammatically shows a vertical section through a hardening apparatus according to the invention.

The container 1 contains a mixture of the fat to be hardened and the catalizer necessary for the process. This container is provided with a circulation pipe 2, the lower end of which is open and the upper end of which projects above the liquid surface in the container, while the lower portion of the pipe is carried down to the bottom of the container.

According to the invention there is provided in the upper, preferably widened portion of the pipe an axial turbine pump with a rotor 3 and guiding vanes 3a. The rotor of the pump is directly coupled to an electric motor 4. The pump draws the fat-catalizer mixture with a great speed from the bottom of the container 1 and injects the same into the reaction space 5, which is filled with hydrogen.

In order to obtain substantially perfect mixing it is of importance that the fat-catalizer mixture flow to the suction opening of the pipe 2 in such a manner that a metal catalizer admixed with the fat is not permited to collect at the bottom of the container 1 but is carried up through the circulation pipe 2, so that the total catalizer quantity, evenly distributed in the fat mass, takes active part in the reaction during the entire process. This is obtained by constructing the lower portion of the container in the form of a cone of streamlined configuration having a tip 6 pointing in the axial direction of the apparatus, the whole being of such a form that the reaction mixture flows to the circulation pipe 2 with the least possible resistance and energy loss.

Mounted on the shaft 7 between the pump 3 and the motor 4 there is an atomizing disc 8 which rotates with the shaft and hurls the mixture in the form of minute droplets into the hydrogen filled reaction chamber 5.

Because of the heat generated by the reaction the temperature rises considerably during hardening. Provision for the necessary cooling is effected in an especially effective manner by means of a cooling coil 18, through which a suitable cooling medium flows. The cooling coil 18 has, in the embodiment shown in the drawing, the shape of a conical spiral which extends from the container wall to the circulation pipe. It may, however, be constructed as a flat spiral, the important feature being that the turns of the spiral should be evenly distributed over the entire free flow cross sectional area of the container.

By the right selection of pump capacity relative to the content of the apparatus, the total head and the shape and diameter of the atomizing disc, it is apparent that one may, with this construction, obtain a very large circulation— and consequently high mixing speed, together with excellent atomizing of the fat-catalizer mixture in the hydrogen atmosphere at a moderate power consumption.

In order to cool the shaft 7 a water jacket 9 is provided in the upper portion of the container 1. The hydrogen is introduced into the container 1 through the pipe 10. When the hardening process has been terminated, the hydrogen in the reaction space may either be blown off through the valve 11 or be drawn off with vacuum through the pipe $V_1$. The finished, hardened fat together with the catalizer is emptied out through the pipe 13 by means of an inactive gas under pressure, which is introduced into the apparatus 1 through the pipe $P_1$.

The charging of the container with fat to be hardened takes place through the pipe 17, while catalizer is charged at 17a. During the charging the container 1 is under vacuum, it being connected with the vacuum pipe $V_1$.

I claim:
1. In an apparatus for hydrogenating materials including fatty acids and glycerides of fatty acids, the combination comprising a closed reaction vessel adapted to contain in the lower portion thereof a liquid to be hydrogenated and in the upper portion thereof a gas containing hydrogen, an upstanding stationary pipe open at both ends being mounted in said vessel to have its upper end projecting above the surface level of said liquid, a pump rotor located below the surface level of said liquid and within the upper portion of said pipe, a driving shaft extending into the vessel from above and secured to said rotor, stationary radial guide vanes secured to said pipe above said rotor and extending above and below the surface of said liquid, a disc mounted on said driving shaft above said guide vanes for rotation with such driving shaft, a conical guide member secured to the bottom of the vessel, and a cooling coil mounted in such vessel to surround said pipe, such cooling coil having convolutions which are equally spaced over the free-flow cross section between the pipe and the vessel wall.

2. Apparatus according to claim 1 wherein the cooling coil is in the form of a conical spiral.

3. In an apparatus for hydrogenating materials including fatty acids and glycerides of fatty acids, the combination comprising a closed reaction vessel adapted to contain in the lower portion thereof a liquid to be hydrogenated and in the upper portion thereof a gas containing hydrogen, an upstanding stationary pipe open at both ends mounted in said vessel, a pump rotor located below the upper end of and within the upper portion of said pipe, a driving shaft extending into the vessel from above and secured to said rotor, stationary radial guide vanes secured to said pipe above said rotor, a disc mounted on said driving shaft above said guide vanes for rotation with such shaft, and a cooling coil mounted in such vessel to surround said pipe, such cooling coil having convolutions which are equally spaced over the free-flow cross section between the pipe and the vessel wall.

4. Apparatus according to claim 3 wherein the cooling coil is in the form of a conical spiral.

CARL FREDRIK HOLMBOE.

REFERENCES CITED

The following references are of record in the file of this patent:

UNITED STATES PATENTS

| Number | Name | Date |
|---|---|---|
| 1,876,994 | Mann | Sept. 13, 1932 |
| 2,031,939 | Dolan | Feb. 25, 1936 |
| 2,134,571 | Morlock | Oct. 25, 1938 |
| 2,146,164 | Wirth | Feb. 7, 1939 |
| 2,295,391 | Durdin | Sept. 8, 1942 |

FOREIGN PATENTS

| Number | Country | Date |
|---|---|---|
| 2,889 | Great Britain | Oct. 1, 1872 |